May 31, 1966 P. MALLERY ET AL 3,254,158
PREFERENCE AND LOCKOUT CIRCUIT
Original Filed Dec. 21, 1959
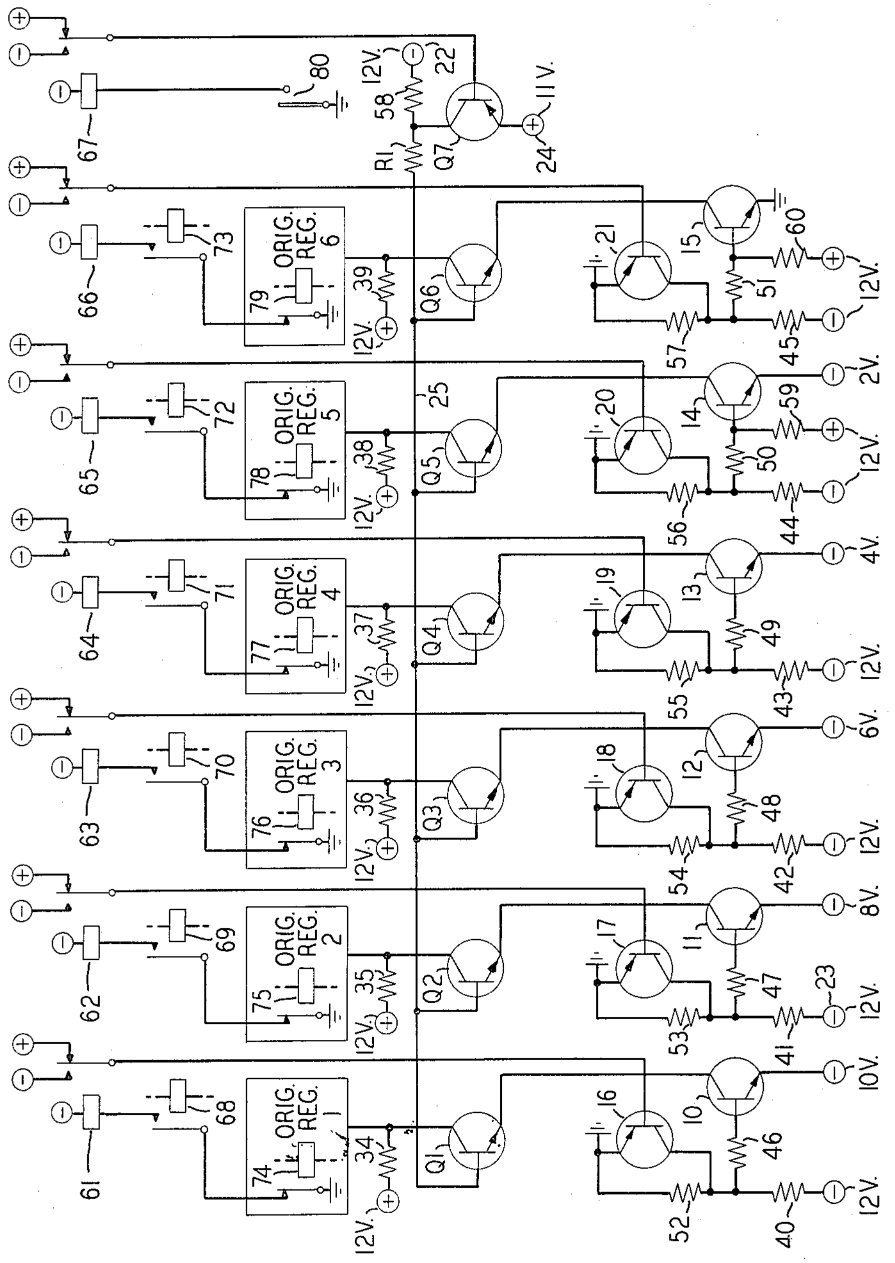
INVENTORS P. MALLERY
Q. W. SIMKINS
BY S E Hollander
ATTORNEY United States Patent Office 3,254,158
Patented May 31, 1966

3,254,158

PREFERENCE AND LOCKOUT CIRCUIT

Paul Mallery, Murray Hill, N.J., and Quinton W. Simkins, Poughkeepsie, N.Y., assignors to Bell Telephone Laboratories, Incorporated, New York, N.Y., a corporation of New York Continuation of application Ser. No. 861,139, Dec. 21, 1959. This application Mar. 26, 1965, Ser. No. 442,878
15 Claims. (Cl. 179—19)

This is a continuation of application Serial No. 861,139, filed December 21, 1959, now abandoned.

This invention relates to lockout circuits and more particularly to a preference lockout circuit for selecting a particular unit of equipment from a common group of similar units.

The general concept of selection of a particular element from a choice of a plurality of elements pervades the design of switching systems. One familiar situation in which a choice of this type becomes necessary is the common control telephone switching system wherein a single calling subscriber may compete with a number of other subscribers for telephone service.

Since certain common control circuitry operates on a space division basis, only one subscriber may be served at any particular time. All other subscribers having access to the same common control equipment must be denied service. Various well-known arrangements have been provided in the past for accomplishing this "lockout" facility. In most instances the circuits thus provided incorporate equipment which when energized would, in advance of the multiple connection, actuate a single element and prevent related similar elements from being activated.

This circuitry has in general operated satisfactorily as evidenced by the extensive utilization of lockout equipment.

But a disadvantage of certain conventional prior art lockout arrangements is the inability to specify or predict the particular element which will be activated. Thus, the selection is predicated on the assumption that each element be granted equal access to the common circuitry on a wholly random basis. On the other hand, if any internal biasing factors intentionally or unintentionally are included in the circuitry, those elements which are pre-disposed to operate in view of a favorable bias will do so in each instance to the virtual exclusion of the unbiased elements.

In telephone operation this presents a significant problem. Thus, in the No. 5 crossbar system, if several originating registers are idle and available for reception of customer dial signals, the "most-favored" register will be selected in each instance. This results in obvious maintenance problems which flow from the inequitable distribution of calls among the originating registers.

It is, of course, possible to establish an order of priority among elements which compete for the same common equipment. In the past, however, it has been necessary in accomplishing this aim to employ circuitry of considerable complexity and cost. Moreover, marginal voltage or current considerations were often a factor in discriminating between adjacent elements. Since marginal amplitude considerations frequently lead to critical voltage or current conditions resulting in erroneous selections, amplitude differentials between adjacent elements had to be increased—a somewhat self-defeative measure since it tends to reduce the number of selections available within a given range.

It is therefore an object of this invention to provide preference of a selected originating register in a No. 5 crossbar telephone system and lockout of remaining idle registers wherein a uniquely simple and reliable arrangement is utilized.

An additional object of this invention is to provide preference and lockout wherein the originating register having highest priority is activated initially and remaining elements are automatically energized in order of decreasing priority.

A further object of this invention is an arrangement providing accurate operation although the differential margin between selected and non-selected elements is relatively low.

Still another object of this invention is the provision of a relatively great number of selections in a relatively small amplitude range.

These and other objects of the invention are achieved in an exemplary embodiment in which a preference circuit having a plurality of transistors is connected in a manner providing a differential preference voltage to the emitter of each transistor which is connected to an idle register. Illustratively, it may be assumed that the transistors collectively store information reflecting the availability of dial or originating registers and that the preference circuit is to select the first or highest priority register. In consequence of the differential biasing the transistor connected to this register will have the highest (or most negative) voltage. The collectors of each of the transistors are independently connected to a particular originating register. When the bases of all of the transistors are energized through a common register, the transistor whose emitter is connected to the most negative potential will be the first transistor turned on and its base current will clamp the voltage applied to the bases of the remaining transistors preventing any other transistor from being turned on. An output signal from the transistor is used to activate the selected originating register.

Moreover, when the highest priority originating register is energized, and an additional register is required, the circuit will automatically and advantageously select the next highest priority element.

A feature of this invention is a circuit including automatic progression from a selected element to the next highest preferred element.

Another feature of this invention is an arrangement for absolutely blocking the operation of certain elements under all conditions of preference.

A further feature of this invention is a transistor selecting circuit adapted to operate with relatively minimal yet safe margins between selected and non-selected elements.

Still another feature of this invention is an arrangement for automatically clamping the base potential applied to all of the transistors in the selecting circuit.

These and other objects and features of the invention may be more readily comprehended from an examination of the following detailed description and attached drawing in which the single figure shows a schematic rendition of an illustrative embodiment of the invention.

Referring now to the figure, it is seen that the six transistor selectors are designated Q1 through Q6. A series of transistor amplifiers 10–15 are utilized to provide a 2-volt differential voltage to adjacent emitters of transistors Q1 through Q6. Trigger transistors 16–21 are provided for actuation of biasing transistors 10–15, respectively.

It is assumed that in the quiescent state transistor Q7 is not energized, and that the contacts of relay 67 are connected to the positive potential source. In consequence, transistors Q1–Q6 are biased to cut-off by the minus 12-volt potential at source 22 over resistance R1.

As the information reflecting the availability of the originating registers is delivered to the base electrodes of transistors 16–21, the convention assumed is that those transistors having a negative input (to indicate an available register) will conduct and those having a positive input (to indicate a non-available register) will remain cut off. For purposes of illustration, it will be assumed that transistors 17, 19, 20 and 21 are energized by a negative input potential and the remaining transistors continue in the cut-off condition. In the illustrative embodiment transistors 17, 19, 20 and 21 are energized symbolically by operation of relays 69, 71, 72 and 73 by suitable means not shown. This results in the operation of the associated relays 62, 64, 65 and 66 and the transfer of the respective contacts from the normal position of connection to a positive source to the operated position of connection to a negative potential source. It is understood that any suitable switching apparatus may be employed to accomplish this result.

Referring specifically to transistor 17, it is apparent that the collector electrode experiences a voltage excursion in the positive direction from a level of minus 12 volts at the source 23 to ground potential at the emitter electrode. This positive potential excursion when applied to the base electrode of transistor 11 drives that transistor into the conducting condition and provides a substantially short circuit impedance between the emitter and collector of transistor 11. In consequence, a negative 8-volt potential is applied from the source connected to the emitter of transistor 11 through the transistor 11 to the emitter of transistor Q2.

In a similar manner transistor 19 activates transistor 13 to apply a minus 4-volt potential to the emitter transistor Q4 and transistors Q5 and Q6 have their emitters connected to minus 2 volts and ground potential, respectively. Since transistors 16 and 18 are not energized by virtue of the positive input thereto, transistors 10 and 12 likewise remain cut off and the emitters of transistors Q1 and Q3 are substantially open-circuited.

When a select pulse is delivered to the base of transistor Q7 by operating manual switch 80 and relay 67 and transferring its contacts to the negative potential source (symbolizing an order to select an originating register), transistor Q7 turns on and its collector potential travels from minus 12 volts at source 22 to plus 11 volts at source 24. The resulting positive voltage pulse is applied to the bases of transistors Q1–Q6 through resistor R1.

It will be appreciated that as the collector of transistor Q7 travels from minus 12 to plus 11 volts it will initially traverse the most negative potentials. In consequence, that transistor of the group Q1–Q6 whose emitter is connected to the most negative potential will be the first transistor turned on. In the assumed illustration transistor Q1 is open-circuited at its emitter, and transistor Q2 has the most negative emitter potential (minus 8 volts). Thus transistor Q2 is energized as soon as the collector of transistor Q7 is slightly more positive than minus 8 volts. When transistor Q2 conducts, base current is delivered through the base of transistor Q2 and in consequence of the low base-emitter impedance of a saturated transistor the voltage level on common bus 25 cannot become more positive and is clamped to the potential at resistor R1.. This result prevents any other transistor in the group Q3–Q6 from being turned on. In addition the voltage at the collector of transistor Q2 falls from plus 12 volts to approximately minus 8 volts thereby delivering a pulse to actuate appropriate equipment (not shown) in originating register 2 rendering the register 2 active and preparing the register for reception of dial pulses.

In this respect it may be observed that the minimum "off" bias on an active transistor in the group Q1–Q6 which is unselected will be the incremental voltage difference between its emitter and that of the selected transistor less the base-emitter drop of the selected transistor.

In the manner described above the voltage on common bus 25 is determined by the selected transistor Q1–Q6.

At this time the selection of the register having been completed, manual switch 80 is opened and relay 75 in originating register 2 is operated by means not shown to interrupt the path to relay 62 permitting the contacts to return to the positive potential source thereby deenergizing transistor 17 by applying a positive potential to the base electrode to turn that transistor off. The voltage at the collector of transistor 17 travels from ground to approximately the voltage at source 23. This provides a negative pulse to transistor 11 which deenergizes that transistor and effectively open-circuits the emitter of transistor Q2.

When manual switch 80 is again closed symbolizing an order to select an additional register, transistor Q4 will now be energized as explained in the preceding description for transistor Q2 as the voltage on common bus 25 rises to slightly more positive than minus 4 volts. Transistor Q3 will be by-passed since under the assumed illustration its emitter is open-circuited. When transistor Q4 is energized, the potential on bus 25 is clamped at the emitter potential of transistor Q4 less the base-emitter drop of that transistor. This prevents transistors Q5 and Q6 from being turned on. An output signal is delivered from the collector of transistor Q4 to originating register 4 to select that register. Manual switch 80 is again opened and relay 77 is operated in the manner explained above to transfer preference to originating register 5.

In similar manner transistors Q5 and Q6 will be selected in turn on the operation of manual switch 80 to select an additional register. Through suitable apparatus, not shown, as not essential to an understanding of the present invention, relays 74–79 may be arranged to release after the selection of register 6 to permit the circuit to recycle.

The parameters of the transistorized portion of the circuit may advantageously take the following illustrative values.

| Resistors: | Ohms |
|---|---|
| **34–39** | 1,330 |
| **40–42** | 2,610 |
| **43–45** | 1,330 |
| **46–51** | 3,480 |
| **52** | 2,870 |
| **53** | 2,150 |
| **54** | 1,780 |
| **58** | 2,610 |
| **59** | 21,500 |
| **60** | 17,800 |
| R1 | 14,700 |

| Transistors: | Commercial designation |
|---|---|
| Q1–Q6 | 2N560 |
| **10–15** | 2N560 |
| **16–21** | 2N559 |
| Q7 | 2N559 |

Although an illustrative embodiment has been shown as exemplary, it is understood that various modifications and departures may be made by those skilled in the art without departing from the scope of the invention.

What is claimed is:

1. A preference and lockout circuit for selecting common circuit elements including a plurality of first transistors having base, emitter and collector electrodes, means for biasing said collector electrodes at a common voltage level, means for interconnecting all of said base electrodes, a signaling source, common impedance means, means for coupling said interconnected base electrodes through said common impedance means to said signaling source, means for individually biasing said emitters at differential voltage levels in a preferential order including second transistors individually connected to each of said emitter electrodes, means for connecting said second transistors to a plurality of individual voltage sources of varying potential levels, means for energizing said second transistors in accordance with the availability of said common elements, and means for actuating said signaling source to apply a signal to said common impedance means to raise the potential of the interconnected base electrodes to substantially the voltage level connected to the most preferred one of said first transistors for energizing said preferred first transistor and inhibiting the energization of any other of said first transistors.

2. A preference and lockout circuit for selecting units of common equipment including a plurality of first transistors having base, emitter and collector electrodes, means for biasing said collector electrodes at a common potential, means for interconnecting all of said base electrodes, common impedance means connected to said base electrodes, a signaling source connected to said common impedance means, a plurality of second transistors individually connected to said emitter electrodes, a plurality of graduated voltage sources individually connected to said second transistors, means for energizing said second transistors in accordance with the availability of said units of equipment for biasing said first transistors in a preferential order, a gating transistor coupling said signaling source to said common impedance means, and means for energizing said gating transistor to apply a signal from said signaling source to said common impedance means to raise the potential of the interconnected base electrodes to substantially the voltage source connected to the most preferred one of said first transistors for energizing said preferred first transistor and inhibiting the energization of any other of said first transistors.

3. An automatic telephone system transistor preference ond lockout circuit for selecting common circuit elements including a plurality of circuit elements to be selected, a plurality of first transistors having base, emitter and collector electrodes, means for biasing said collector electrodes at a common potential level, means for interconnecting said base electrodes of said first transistors, a signaling source, common impedance means coupling said base electrodes to said signaling source, a second plurality of transistors individually connected to said emitter electrodes of said first transistors, the emitter electrodes of said second transistors being connected to a plurality of graduated potential sources in accordance with the order of priority of said circuit elements, a third plurality of transistors individually connected to said second plurality of transistors, means for energizing said third plurality of transistors in accordance with the availability of said circuit elements thereby to energize the associated second transistors and to apply the potential connected to the emitter electrodes of said energized second transistors to the emitter electrodes of said first transistors for establishing a preferential order in said first transistors, means for energizing said signaling source to apply a signal through said common impedance means to raise the potential of the interconnected base electrodes to substantially the emitter potential of the most preferred one of said first transistors for energizing said preferred first transistor and inhibiting the energization of any other of said first transistors, and means connecting said circuit elements individually to the collector electrodes of said first transistors thereby to actuate the circuit element connected to said preferred one of said first transistors.

4. A telephone switching system preference and lockout circuit for selecting units of common equipment in order of priority including a plurality of first transistors having base, emitter and collector electrodes, means for biasing said collector electrodes at a common potential, a plurality of circuit elements to be selected, means connecting said circuit elements individually to said collector electrodes of said first transistors, means for interconnecting all of said base electrodes, common impedance means connected to said base electrodes, a signaling source connected to said common impedance means, a plurality of second transistors individually connected to said emitter electrodes of said first transistors, a plurality of graduated voltage sources individually connected to said second transistors in accordance with the order of priority of said circuit elements, means for energizing said second transistors for coupling said graduated voltage sources to said first transistors for establishing a preferential order in said first transistors in accordance with the availability of said circuit elements to be selected, means for energizing said signaling source to apply a signal through said common impedance means to raise the potential of the interconnected base electrodes to substantially the voltage source coupled to the most preferred one of said first transistors for energizing said preferred first transistor and inhibiting the energization of any other of said first transistors thereby to actuate the circuit element connected to said preferred one of said first transistors, and additional means for de-energizing said preferred first transistor and energizing another of said first transistors to select the circuit element next in order of priority.

5. A telephone switching system preference and lockout circuit including a plurality of circuit elements to be selected, a plurality of transistors having base, emitter and collector electrodes, means for biasing said collector electrodes at a common potential and for connecting said collector electrodes individually to said circuit elements, common impedance means connected to said base electrodes, means for individually biasing said emitters at graduated voltage levels for establishing a preferential order of circuit elements in accordance with the availability of said circuit elements including means for biasing said emitters of transistors associated with non-available circuit elements to absolutely block selection of said non-available elements, and a signaling source for applying a signal to said common impedance means to raise the potential of the interconnected base electrodes to substantially the emitter voltage level of the transistor coupled to the most preferred one of said circuit elements to energize said preferred circuit element and inhibit the energization of any other of said elements.

6. A telephone switching system preference and lockout circuit for selecting common circuit elements including a plurality of circuit elements to be selected, a plurality of first transistors having emitter, base and collector electrodes, means for biasing said collector electrodes at a common voltage level, means for individually connecting said elements to said collector electrodes, means for interconnecting all of said base electrodes, a signaling source, common impedance means, means for coupling said interconnected base electrodes through said common impedance means to said signaling source, means for individually biasing said emitters at differential voltage levels reflecting the priority and availability of said circuit elements including second transistors individually connected to each of said emitter electrodes, means for connecting said second transistors to a plurality of individual voltage sources of varying potential, means connectable to said second transistors to block operation of certain of said first transistors and the associated circuit elements, means for energizing said signaling source to apply a signal to said common impedance means to raise the potential of the interconnected base electrodes to substantially the voltage level connected to the most preferred one of said first transistors for energizing said preferred transistor to actuate the circuit element connected to said preferred first transistor, and means for subsequently de-energizing said preferred first transistor thereby to automatically prepare for energization of another of said first transistors next highest in order of priority.

7. A telephone system preference and lockout circuit for selecting units of common equipment including a plurality of first transistors having base, emitter and collector electrodes, means for biasing said collector electrodes at a common potential, means for individually connecting said units to said collector electrodes, means for interconnecting all of said base electrodes, common impedance means connected to said base electrodes, signaling means connected to said common impedance means, a plurality of second transistors individually connected to said emitter electrodes, a plurality of differential voltage sources individually connected to said second transistors to reflect the order of priority of said units of common equipment, means for energizing said second transistors for coupling said differential voltage sources to said first transistors for establishing a preferential order in said first transistors in accordance with the availability of said units of equipment, a gating transistor coupling said signaling means to said common impedance means, and means for energizing said gating transistor to apply a signal from said signaling means to said common impedance means thereby to energize the most preferred one of said first transistors including means for raising the potential of the interconnected base electrodes to substantially the potential of said voltage source connected to said second transistor associated with the emitter electrode of said preferred first transistor, and means for deenergizing said preferred first transistor thereby to automatically prepare for energization of another of said first transistors of next highest priority.

8. A telephone system preference and lockout circuit for selecting units of common equipment including a plurality of first transistors having base, emitter and collector electrodes, means for biasing said collector electrodes at a common potential, means for individually connecting said units to said collector electrodes, means for interconnecting all of said base electrodes, common impedance means connected to said base electrodes, signaling means connected to said common impedance means, a plurality of second transistors individually connected to said emitter electrodes, a plurality of differential voltage sources individually connected to said second transistors to reflect the order of priority of said units of common equipment, means for energizing said second transistors in accordance with the availability of said units of equipment, a gating transistor coupling said signaling means to said common impedance means, relay means, a first potential source, a second potential source, and switching means, said relay means being adapted in response to the operation of said switching means to connect said gating transistor from said first potential source to said second potential source for energizing said gating transistor to apply a signal from said signaling means to said common impedance means thereby to energize a selected one of said first transistors including means for raising the potential of the interconnected base electrodes to substantially the potential of said voltage source connected to said second transistor associated with the emitter electrode of said selected first transistor, and means for de-energizing said selected first transistor thereby to automatically prepare for energization of another of said first transistors of next highest priority.

9. A telephone system preference and lockout circuit for selecting units of common equipment including a plurality of first transistors having base, emitter and collector electrodes, means for biasing said collector electrodes at a common potential, means for individually connecting said units to said collector electrodes, means for interconnecting all of said base electrodes, common impedance means connected to said base electrodes, signaling means connected to said common impedance means, a plurality of second transistors individually connected to said emitter electrodes, a plurality of differential voltage sources individually connected to said second transistors to reflect the order of priority of said units of common equipment, a plurality of relays individual to each of said second transistors, a first potential source, and a second potential source, said relays being operative to connect said second transistors from said first potential source to said second potential source for energizing said second transistors in accordance with the availability of said units of equipment, a gating transistor coupling said signaling means to said common impedance means, and means for energizing said gating transistor to apply a signal from said signaling means to said common impedance means thereby to energize a selected one of said first transistors including means for raising the potential of the interconnected base electrodes to substantially the potential of said voltage source connected to said second transistor associated with the emitter electrode of said selected first transistor, and means for de-energizing said selected first transistor thereby to automatically prepare for energization of another of said first transistors of next highest priority.

10. A telephone system preference and lockout circuit in accordance with claim 9 wherein said means for de-energizing said selected first transistor includes means for releasing said relay individual to said second transistor associated with said selected first transistor thereby to connect said second transistor from said second potential source to said first potential source.

11. In an electronic device, a plurality of switching means each having a first electrode, a second electrode and a control electrode, means for impressing an equal voltage on the second electrode of each of said switching means, biasing means for impressing voltages on the first electrodes of said switching means, the first electrode voltage of at least one of said switching means being less than the first electrode voltage of the other switching means, means separate from said biasing means for impressing an equal voltage on the control electrode of each of said switching means to cause the switching means of lowest first electrode voltage to be actuated, and means for preventing the actuation of the remaining switching means when one of said switching means is actuated.

12. In an electronic device as in claim 1, wherein the preventing means includes resistance means connected to the control electrodes of said switching means.

13. In an electronic device, a plurality of electronic switching means each having a first electrode, a second electrode and an electrode for controlling the conduction of charge carriers between said first and second electrodes to actuate said switching means, means for impressing an equal voltage on the second electrode of each said switching means, biasing means for impressing voltages on the first electrodes of said switching means, the first electrode voltage of at least one of said switching means being less than the first electrode voltage of the other switching means, means separate from said biasing means for impressing an equal voltage on the control electrode of each said switching means to cause the switching means of lowest first electrode voltage to be actuated, and means for blocking the actuation of the remaining switching means when one of said switching means is actuated.

14. An electronic device as in claim 13 wherein the blocking means includes resistance means connected to the control electrodes of said switching means.

15. In a preference and lockout circuit, a plurality of electronic switching means each having a first electrode, a second electrode and an electrode for controlling the conduction of charge carriers between said first and second electrodes to actuate said switching means, means for biasing said second electrodes at a common potential, means for individually biasing said first electrodes at graduated voltages, and means independent of said biasing means for impressing equal voltages on all said control electrodes to cause the switching means of lowest first electrode potential to be actuated and to block the actuation of the remaining switching means.

(References on following page)

References Cited by the Examiner

UNITED STATES PATENTS

| | | | |
|---|---|---|---|
| 2,315,958 | 4/1943 | Hill et al. | 317—137 X |
| 2,438,042 | 3/1948 | Edgarton | 179—27.5 |
| 2,706,222 | 4/1955 | Bjornson | 179—18.3 |
| 2,857,470 | 10/1958 | Faulkner | 179—18.61 |
| 2,892,103 | 6/1959 | Scarbrough | 179—18.3 |
| 3,030,554 | 4/1962 | Leesom et al. | 317—139 X |

ROBERT H. ROSE, *Primary Examiner.*

WALTER L. LYNDE, *Assistant Examiner.*